No. 846,263. PATENTED MAR. 5, 1907.
J. P. TIBBITS.
DISH DRAINER.
APPLICATION FILED SEPT. 8, 1906.
2 SHEETS—SHEET 1.
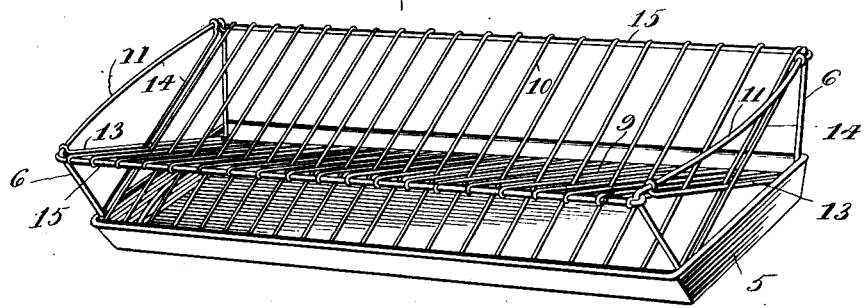
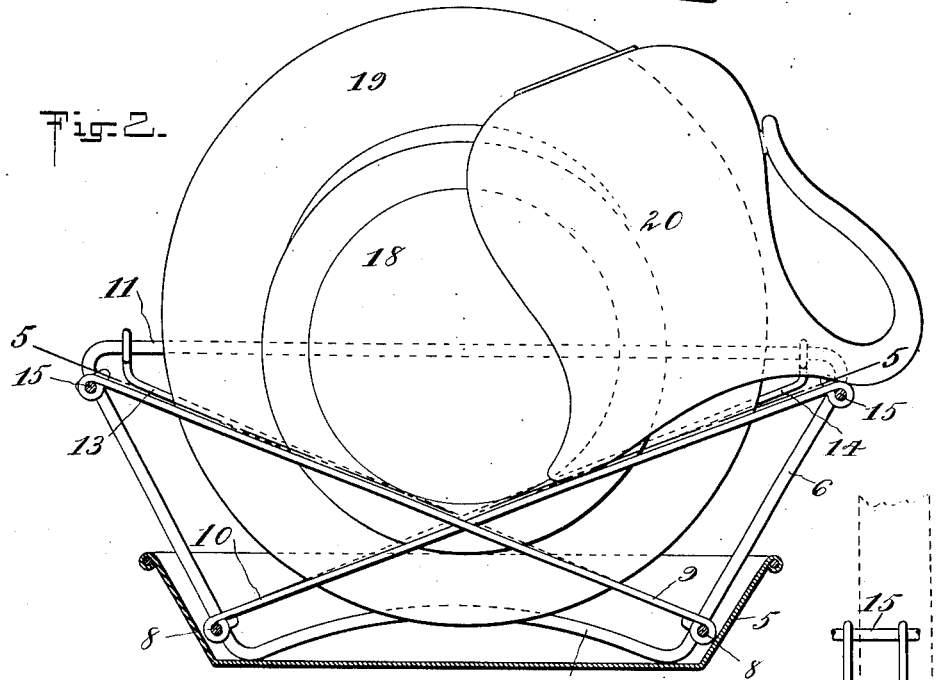
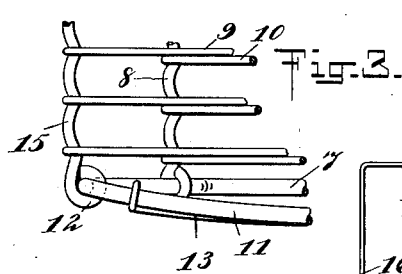
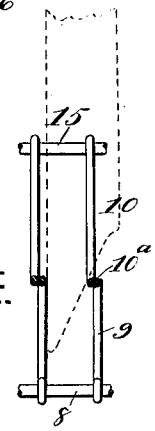
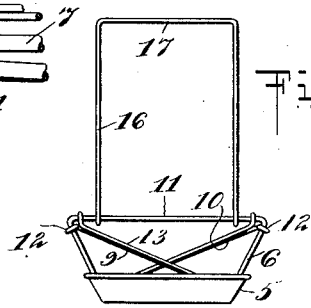
WITNESSES
Gale Cheney
Walton Harrison
INVENTOR
James P. Tibbits
BY Munn & Co
ATTORNEYS No. 846,263. PATENTED MAR. 5, 1907.
J. P. TIBBITS.
DISH DRAINER.
APPLICATION FILED SEPT. 8, 1906.
2 SHEETS—SHEET 2.
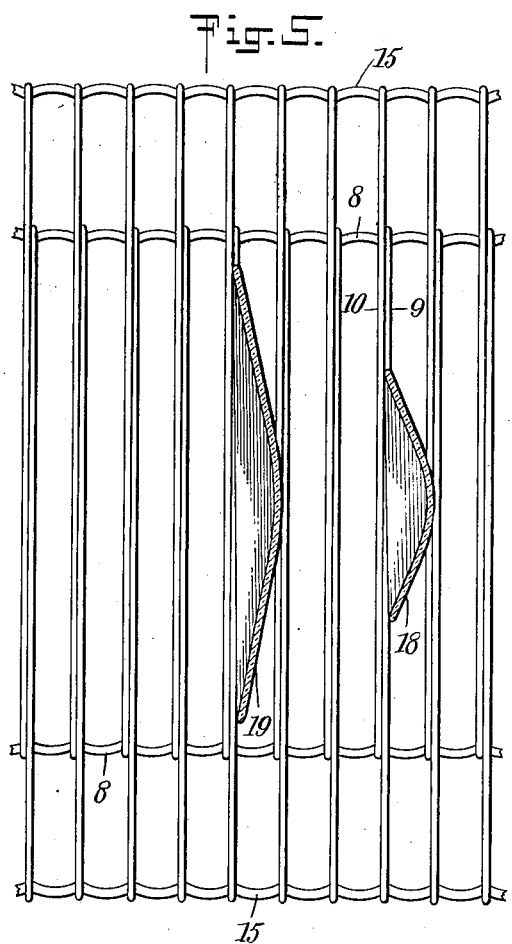
WITNESSES
INVENTOR
James P. Tibbits
BY
ATTORNEYS

UNITED STATES PATENT OFFICE.

JAMES P. TIBBITS, OF NEW YORK, N. Y.

DISH-DRAINER.

No. 846,263.           Specification of Letters Patent.           Patented March 5, 1907.

Application filed September 8, 1906. Serial No. 333,740.

*To all whom it may concern:*

Be it known that I, JAMES P. TIBBITS, a citizen of the United States, and a resident of the city of New York, borough of Manhattan, in the county and State of New York, have invented a new and Improved Flexible Wire Dish Drainer and Drier, of which the following is a full, clear, and exact description.

My invention relates to household utensils, this being a device for holding plates, saucers, and other dishes in such position as to allow the same to drain thoroughly and makes an excellent dish-warmer.

My invention further relates to an improved type of rack in which the dishes are as far as practicable supported edge upward, yet rest easily in position without any pressure except that due to their own weight, and suspended clear of the bottom of the drip-tray in such manner that the entire edge of each dish is free.

Reference is to be had to the accompanying drawings, forming a part of this specification, in which similar characters of reference indicate corresponding parts in all the figures.

Figure 1 is a perspective view showing the improved rack as resting within a drip-tray provided for its reception. Fig. 2 is an enlarged vertical section through the pan and the rack and showing how dishes are mounted upon the rack. Fig. 3 is a fragmentary plan view of a part of the rack, showing particularly the disposition of the span-wires crossing the same. Fig. 4 is a fragmentary sectional detail showing how the span-wires are crossed in pairs. Fig. 5 is a fragmentary section, upon the line 5 5 of Fig. 2, looking toward the bottom of the sheet and showing how the dishes are supported by the span-wires. Fig. 6 is an end elevation showing my improved rack as provided with handles whereby it may be lifted from place to place or let down into a rectangular vessel, as hereinafter described.

A drip-tray 5, made, preferably, of sheet metal, is the receptacle into which the rack is placed to receive the drip. End frames 6, made, preferably, of spring-wire of large diameter, are given the conformity indicated in Fig. 2, each of these end frames being provided with a portion 7 bending upwardly, so as to clear the bottom of the pan 5. Longitudinal wires 8 are bent into the form indicated in Fig. 3, or, in other words, rendered sinuous. Span-wires 9 10 are arranged in pairs, as indicated in Figs. 3 and 4, the wires of each pair touching each other at $10^a$, but not fastened together, as shown in Fig. 4. Each end frame 6 is provided with a horizontal portion 11 and is encircled by bent portions or laps 12 12 of the span-wires 9 10. Two wires 13 14 are disposed at each end of the rack and are curved slightly outward. Longitudinal wires 15 extend from one end of the rack to the other and are used for supporting the span-wires 9 10. The wires 15 are for this purpose bent or rendered sinuous, as indicated in Fig. 3.

The rack complete and resting in the pan 5 is shown in Fig. 1. If, however, it be desired to place the rack in a rectangular vessel, such as a boiler, a loop 16 of wire, provided with a handle portion 17, is placed upon each of the portions 11 of the end frames. The operator may now grasp the handle portion 17 and raise the rack or may lower it into any larger vessel. Saucers and plates 18 19 are inserted within the rack, as indicated in Fig. 2. To accomplish this purpose, the operator takes each dish in his hand, turns the dish upon its edge, and rests it lightly upon and between the span-wires 9 10. A considerable number of dishes can thus be accommodated in a comparatively small rack. Pitchers 20 and similar articles may be simply rested upon one edge of the rack and some portion thereof be allowed to rest upon the span-wires 9 10. It will be noted that these span-wires touch the dishes at a comparatively small area of contact, and, further, that the span-wires being of metal there is nothing to prevent the thorough cleansing of the dishes. Moreover, it will be observed that while each dish is supported at four points of contact the extreme peripheral edge of each dish is entirely free, so that the drainage is perfect, also that each dish is by virtue of its own weight retained in a condition of stable equilibrium and is not easily caused to rock if the rack be shaken or inclined.

I do not limit myself to any particular manner or purpose in which my device is to be used. Neither do I limit myself to the use of any particular material of which the rack is to be constructed.

The dishes having been inserted within the rack, as above described, are allowed to drain until perfectly dry. If desired, they may be first washed or partially washed before being inserted within the rack. Some operators prefer to place them in the rack exactly as they come from the table and then merely pour boiling water over them. These are matters of individual preference.

Having thus described my invention, I claim as new and desire to secure by Letters Patent—

1. A dish drainer and drier, comprising a plurality of longitudinal wires, span-wires hooked upon said longitudinal wires and crossing each other in pairs, and means for supporting said longitudinal wires.

2. A dish drainer and drier, comprising end frames, longitudinal members extending from one of said end frames to the other and connected at the top thereof, other longitudinal members extending from one of said frames to the other and connected at the bottom thereof, span-wires extending from the longitudinal member at the top of said end frames and crossing to the longitudinal member at the bottom of the opposite side of said end frames, and other span-wires crossing said span-wires first mentioned, each span-wire loosely engaging a particular span-wire crossing it, for the purpose of supporting dishes.

3. The combination of a wire framework, a number of span-wires extending from one part of said framework to another, said span-wires being in the same plane, and another number of span-wires extending from one part of said framework to another and being similarly in the same plane, the arrangement being such that the plane of one set of span-wires crosses the plane of another set of span-wires, one span-wire in one plane being paired with another span-wire in the other plane, the crossing-points of the several pairs being located sufficiently above the bottom to enable dishes supported between pairs to rest with their lower edges clear, substantially as described.

4. The combination of a number of span-wires occupying a definite plane, and a number of other span-wires occupying a definite plane crossing said first-mentioned plane, each span-wire of one plane being paired with a single wire of the other plane, the wires of each pair being disconnected from each other but resting in contact.

5. The combination of a framework, and span-wires connected therewith and crossing each other, the crossing-point of said wires being so positioned as to admit the edges of dishes between successive crossing-points and to support said dishes with the lower edges thereof free.

6. The combination of a drip-tray, and a wire frame mounted therein and provided with wires for supporting dishes, said wires being so crossed as to engage said dishes at points removed from the edges thereof, in order to allow said edges to clear said drip-tray.

7. A dish drainer and drier, comprising a rack having end frames provided with portions bent upward so as to form a surface upon which said frames may rest, a plurality of supporting members extending from one of said end frames to the other, and span-wires arranged in pairs, the wires of each pair crossing each other and engaging said supporting members.

In testimony whereof I have signed my name to this specification in the presence of two subscribing witnesses.

JAMES P. TIBBITS.

Witnesses:
  WALTON HARRISON,
  EVERARD B. MARSHALL.